(12) United States Patent
Zalewski

(10) Patent No.: US 9,138,647 B2
(45) Date of Patent: *Sep. 22, 2015

(54) GAME PLAY SKILL TRAINING

(71) Applicant: Sony Computer Entertainment America LLC, San Mateo, CA (US)

(72) Inventor: Gary M. Zalewski, Oakland, CA (US)

(73) Assignee: Sony Computer Entertainment America LLC, San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/275,886

(22) Filed: May 13, 2014

(65) Prior Publication Data

US 2014/0248960 A1    Sep. 4, 2014

Related U.S. Application Data

(60) Continuation of application No. 13/540,306, filed on Jul. 2, 2012, now Pat. No. 8,721,451, which is a division of application No. 12/370,569, filed on Feb. 12, 2009, now Pat. No. 8,235,817.

(51) Int. Cl.
*A63F 9/24* (2006.01)
*A63F 13/30* (2014.01)
*H04L 29/08* (2006.01)
*H04L 29/06* (2006.01)

(52) U.S. Cl.
CPC ............... *A63F 13/12* (2013.01); *H04L 67/06* (2013.01); *H04L 67/22* (2013.01); *H04L 67/38* (2013.01); *A63F 2300/558* (2013.01); *A63F 2300/5513* (2013.01); *A63F 2300/577* (2013.01)

(58) Field of Classification Search
USPC .......................................................... 463/42
See application file for complete search history.

(56) References Cited

U.S. PATENT DOCUMENTS

| 5,850,352 A | 12/1998 | Moezzi |
| 5,926,179 A | 7/1999 | Matsuda |
| 6,325,717 B1 | 12/2001 | Kawagoe |

(Continued)

FOREIGN PATENT DOCUMENTS

JP    2005004305    1/2005

OTHER PUBLICATIONS

"CS Extreme—Bringing CS to the Limit," The Mulitcast Spectator Mode—Dec. 6, 2001, http://www.cs-extreme.netlguides/HL TV/HL TV.asp.

(Continued)

*Primary Examiner* — Yu-Hsi D Sun
(74) *Attorney, Agent, or Firm* — Lewis Roca Rothgerber LLP

(57) ABSTRACT

Embodiments of the present invention provide a library of video related to game play involving the use of particular objects. By observing game play of users in a game play environment, determinations may be made as to users who excel at the use of a particular object. Video of game play related to these users and a particular object may be created, cataloged, and stored for later use by users that lack proficiency with that object. By observing video of game players with particular skill as to an object, less skilled players may improve their game play thereby avoiding frustration with a game, which may lead to a loss of interest. Acquisition and proffering of video may be facilitated through the use of an analytics server or functional software module that observes game play and identifies players of particular skill or lack thereof.

23 Claims, 4 Drawing Sheets

(56) References Cited

U.S. PATENT DOCUMENTS

| | | |
|---|---|---|
| 6,353,479 B1 | 3/2002 | Lubawy |
| 6,606,479 B2 | 8/2003 | Cook |
| 6,634,949 B1 | 10/2003 | Briggs |
| 6,999,083 B2 | 2/2006 | Wong |
| 8,235,817 B2 | 8/2012 | Zalewski |
| 8,721,451 B2 | 5/2014 | Zalewski |
| 2004/0180317 A1 | 9/2004 | Bodner |
| 2005/0095569 A1 | 5/2005 | Franklin |
| 2006/0105299 A1 | 5/2006 | Ferris |
| 2008/0119286 A1 | 5/2008 | Brunstetter |
| 2008/0148165 A1* | 6/2008 | Zalewski ................ 715/764 |
| 2010/0144444 A1* | 6/2010 | Graham ..................... 463/42 |
| 2012/0270647 A1 | 10/2012 | Zalewski |

OTHER PUBLICATIONS

Ham, Tom, "Multicast Spectator Tech for Half-Life," GameSpy Articles, http://archive.gamespy.com/articles/june01/ hlmod3b/.

Otten, Martin, "Broadcasting Virtual Games in the Internet," Jun. 2001, www.slipgate.de/download/ BroadcastingVirtuaiGames.pdf.

* cited by examiner

GAME PLAY SKILL TRAINING

CROSS-REFERENCE TO RELATED APPLICATIONS

The present application is a continuation and claims the priority benefit of U.S. patent application Ser. No. 13/540,306 filed Jul. 2, 2012, now U.S. Pat. No. 8,721,451, which is a divisional and claims the priority benefit of U.S. patent application Ser. No. 12/370,569 filed Feb. 12, 2009, now U.S. Pat. No. 8,235,817, the disclosures of which are incorporated herein by reference.

The present application is related to U.S. patent application Ser. No. 12/283,854 filed Sep. 15, 2008 and U.S. patent application Ser. No. 11/848,451 filed Aug. 31, 2007, the disclosures of which are incorporated herein by reference.

BACKGROUND OF THE INVENTION

1. Field of the Invention

The present invention generally relates to interactive video game play. More specifically, the present invention relates to observing the actions of other game players with respect to their interaction with certain objects or objectives in a game environment in an attempt for the observer or spectator to become more adept in their interaction with those same objects or with respect to the same objectives.

2. Description of the Related Art

Early video game play involved two-dimensional game environments where characters under the control of a game player were stationary or had severely limited motion. For example, 1978's "Space Invaders" was a two-dimensional shooter game in which the game player controlled a laser cannon that moved horizontally across the bottom of the screen while firing at five rows of descending aliens that moved horizontally back and forth across the screen. Later games such as "Asteroids" in 1979 used vector graphics in a two-dimensional space that wrapped around both screen axes. The game player navigated a spaceship in an asteroid field while shooting and destroying asteroids and flying saucers.

The evolution of video games continued with control devices that provided for multiple inputs. For example, while "Space Invaders" and "Asteroids" only required a joystick and 'fire' button, the 1983 introduction of the Nintendo Entertainment System saw a controller with directional control, two 'input' buttons ('A' and 'B') as well as 'start' and 'select' keys. Commands that were made up of combinations of control input (e.g., simultaneously providing directional input while pressing an input button) also became common. The 1988 Sega Genesis included a controller with directional control and three input buttons, which was soon follows by a version with six input buttons.

Development of three-dimensional game environments, the rise of the first-person shooter genre, increased options for game player directional and input control, and the unmatched processing and graphics power offered by modern day game platforms such as the PlayStation3® from Sony Computer Entertainment Inc. have made game play increasingly complex. Game players no longer simply move left-to-right and point-and-shoot in a two-dimensional game environment. Modern day game play environments require a game player to directionally control a game character along the X, Y, and Z axis; manage the jumping, ducking, and crawling of that character; manage the selection of any number of objects that the character might be carrying; control the use of those objects; and attempt to achieve any number of goals or objectives in the game environment, which may include acquisition of additional objects, arrival at checkpoints, and/or combat with other characters.

Selecting and managing an object while on the run and under attack may prove incredibly difficult to even the most experienced game players. In a multi-player game environment (for example, a networked game environment), the inability to successfully manage objects possessed by a game character may lead to early elimination of a game player in combat or in an effort to otherwise achieve certain objectives. Continued failure may discourage the game player from continued game play with respect to a particular title, purchasing other games in a particular genre, or from engaging in use of a particular game platform altogether. There is, therefore, a need for assisting a game player with selection and management of objects and accomplishing objectives in an interactive game environment.

SUMMARY OF THE CLAIMED INVENTION

In a first claimed embodiment of the present invention, a method for object-oriented observation is recited. Through the claimed method, data that corresponds to game play of a plurality of users is analyzed. Analysis of the game play data takes place at a computing device configured to analyze game play. The analyzed data includes the use of a specific object during game play. A prowess of a first user with respect to that specified object is identified as a result of analyzing data corresponding to game play of the first user. A prowess of a second user with respect to the specified object is also identified, the second user having a lesser prowess than that of the first user. Identification of the prowess of the second user results from analysis of data corresponding to game play of the second user. The second user is provided access to video of use of the specified object by the first user.

A second claimed embodiment of the prevent invention recites a computer-readable storage medium. Embodied on the storage medium is a program, the execution of which by a processor provides a method for object based observation. Through this method, data that corresponds to game play of a plurality of users is analyzed. Analysis of the game play data takes place at a computing device configured to analyze game play. The analyzed data includes the use of a specific object during game play. A prowess of a first user with respect to that specified object is identified as a result of analyzing data corresponding to game play of the first user. A prowess of a second user with respect to the specified object is also identified, the second user having a lesser prowess than that of the first user. Identification of the prowess of the second user results from analysis of data corresponding to game play of the second user. The second user is provided access to video of use of the specified object by the first user.

A third claimed embodiment is also for a computer-readable storage medium, that medium having embodied thereon a program. Execution of the program by a processor performs a method for object based observation. Through the method, data corresponding to game play of a plurality of users is received. The game play data is analyzed, the analysis including data corresponding to the use of a specific object during game play. A prowess of a first user from the plurality of users is identified; that prowess corresponding to use of the specified object as a result of analyzing the data corresponding to game play of the first user. A prowess of a second user with respect to the specified object as a result of analyzing the data corresponding to game play of the second user is also identified. The second user is associated with a computing device receiving and analyzing the game play data, the second user having a prowess less than that of the first user. Video of use of the specified object by the first user is displayed to the second user.

DETAILED DESCRIPTION

Embodiments of the present invention provide a library of video related to game play involving the use of particular objects or achieving particular objectives. Through observation and analysis of game play of users in a game play environment, determinations may be made as to which users excel at the use of a particular object or at accomplishing a particular objective. Video of game play related to these particularly adept users with respect to a particular object or objective may be created, cataloged, and stored for later observation by those users that lack proficiency with the same object. By observing video of skilled game players interacting with an object or accomplishing an objective and learning from the same, less skilled players may improve their game play thereby avoiding unnecessary frustration and loss of interest in a particular game. Acquisition and proffering of video may be facilitated through the use of an analytics server or functionally equivalent software module that observes and analyzes game play thereby identifying players possessing (or lacking) particular skill or prowess with respect to a given object or objective.

Figure 1A:
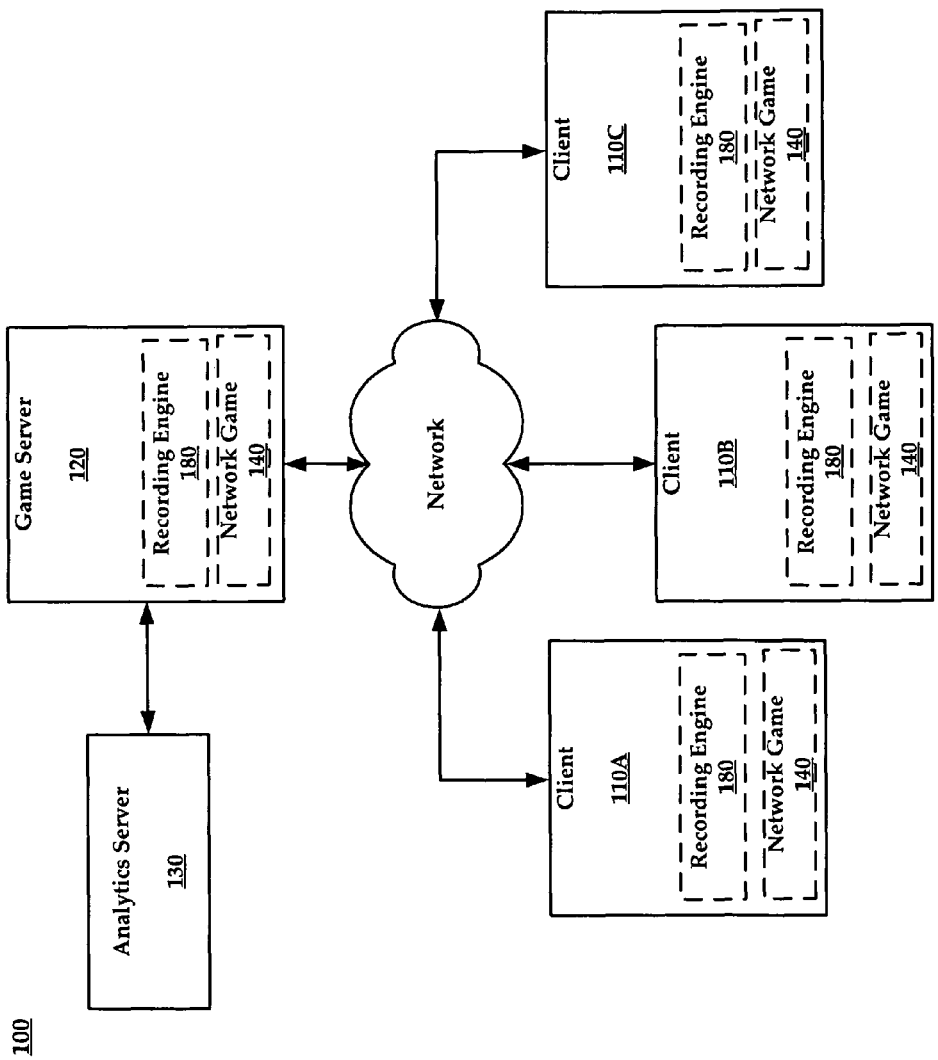
FIG. 1A illustrates a server-client environment where game clients are in communication with a game server via a communications network; the game server is in further communication with a game analytics server.

FIG. 1A illustrates a server-client environment 100 where game clients 110A . . . 110C are in communication with a game server 120 via a communications network; the game server 120 is in further communication with a game analytics server 130. In the server-client environment 100 of FIG. 1A, game clients 110A . . . 110C communicate with game server 120. A network game 140—or a portion thereof—may be hosted at the game server 120. In some embodiments, a game client 110A . . . 110C may execute a portion of a game (e.g., a portion embodied on a compact disc) while certain information or portions of game data are accessed from the game server 120.

The network game 140 may be 'community based' or a 'multi-player' game. In these types of games, players may compete with one another over a communications network like that illustrated in FIG. 1A. Competition may occur out of real-time whereby game play occurs on an individual-by-individual basis; information concerning that game play is later reported to the game server 120. The reported information may subsequently be shared or otherwise made accessible to other game players on an as-needed basis. This information may include scores, game play results, information concerning achievements during game play, ladder ranking information, video 'clips' generated during game play, and metadata related to various aspects of game play.

Competition may also be head-to-head or in real-time whereby data related to game play is generated by each game client 110A . . . 110C and reported to the game server 120. This information may then be distributed to the other game clients (e.g., game clients 110B and 110C) by the game server 120. Data reported to the game server 120 in a real-time or head-to-head embodiment may include data concerning the status of game play at a particular game client (e.g., game client 110A); for example, the physical position of a player in a game universe (e.g., the location of that player on a 'map' of the game play world). Data may also encompass the status of any given player including health, possessions, or characteristics such as strength, stamina, or particular skills (e.g., magic, weapons prowess, or slight-of-hand). Information generated in a real-time or head-to-head embodiment may also encompass that information discussed with respect to a non-real-time gaming environment including video 'clips' and game play metadata.

Analytics server 130 may access certain information reported to the game server 120 by game clients 110A . . . 110C. Analytics server 130 may aggregate and analyze this information to identify certain abilities (or lack thereof) by various game players. For example, analytics server 130 may aggregate and analyze game play data and determine that a particular game player is proficient with an object such as a weapon or is particularly adept at achieving certain objectives. Analytics server 130 may likewise identify that another game player is deficient with that particular weapon or performs poorly with respect to attempting accomplish certain objectives. The analytics server 130 may be similar to that described in U.S. patent application Ser. No. 12/283,854 for "Metrics-Based Gaming Operations."

Figure 1B:
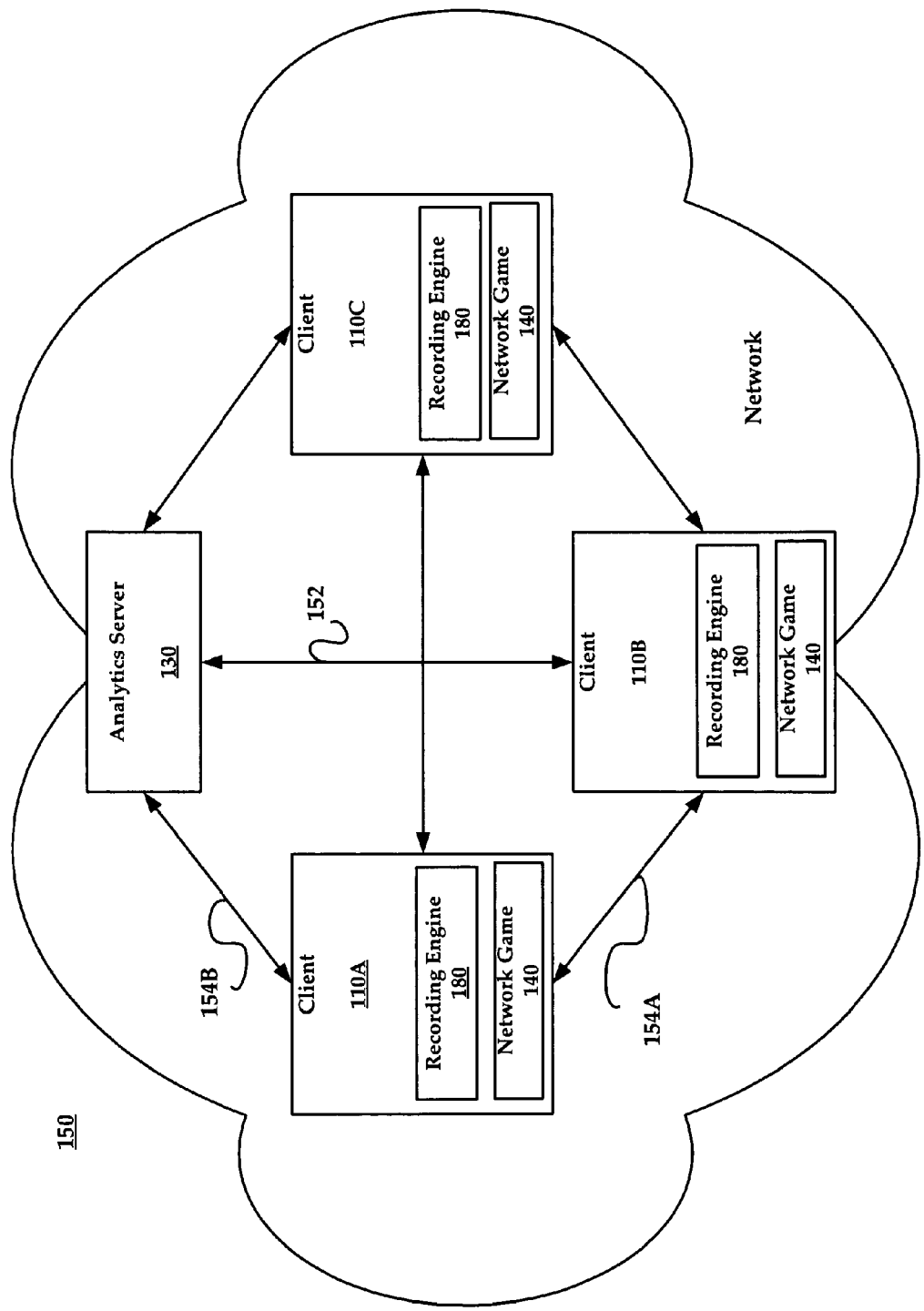
FIG. 1B illustrates an alternative game environment where game clients operate in a peer-to-peer configuration and are each in communication with an analytics server.

FIG. 1B illustrates an alternative game environment 150 where game clients (110A . . . 110C) operate in a peer-to-peer configuration and are each in communication with an analytics server 130. Communications with the analytics server 130 by any particular peer (e.g., client 110B) may be direct as evidenced by communications path 152. Communications with the analytics server 130 may also take place via another peer or computing node in the game environment as evidenced by communications paths 154A and 154B.

In FIG. 1B, the game clients 110A . . . 110C and analytics server 130 each perform similar if not identical functionalities as described with respect to FIG. 1A; the game server 120, however, is omitted. As a result, the network game 140 is hosted at each game client 110A . . . 110C. Each game client 110A . . . 110C locally executes network game 140 and relays information and game data to each of the other peers through the peer-to-peer network. Communications between each of the peers may be direct or an indirect, whereby information and game play data is conveyed through one or more other peers or nodes in the game environment 150.

Data may be conveyed amongst the various peers (clients 110A . . . 110C) using any variety of communications protocols including multicast, broadcast, and unicast. Data may likewise be acquired by the analytics server 130 using any one of the aforementioned protocols. Certain data exchanged amongst clients 110A . . . 110C and analytics server 130 may be addressed using an Address Resolution Protocol including a Media Access Control address.

Figure 1C:
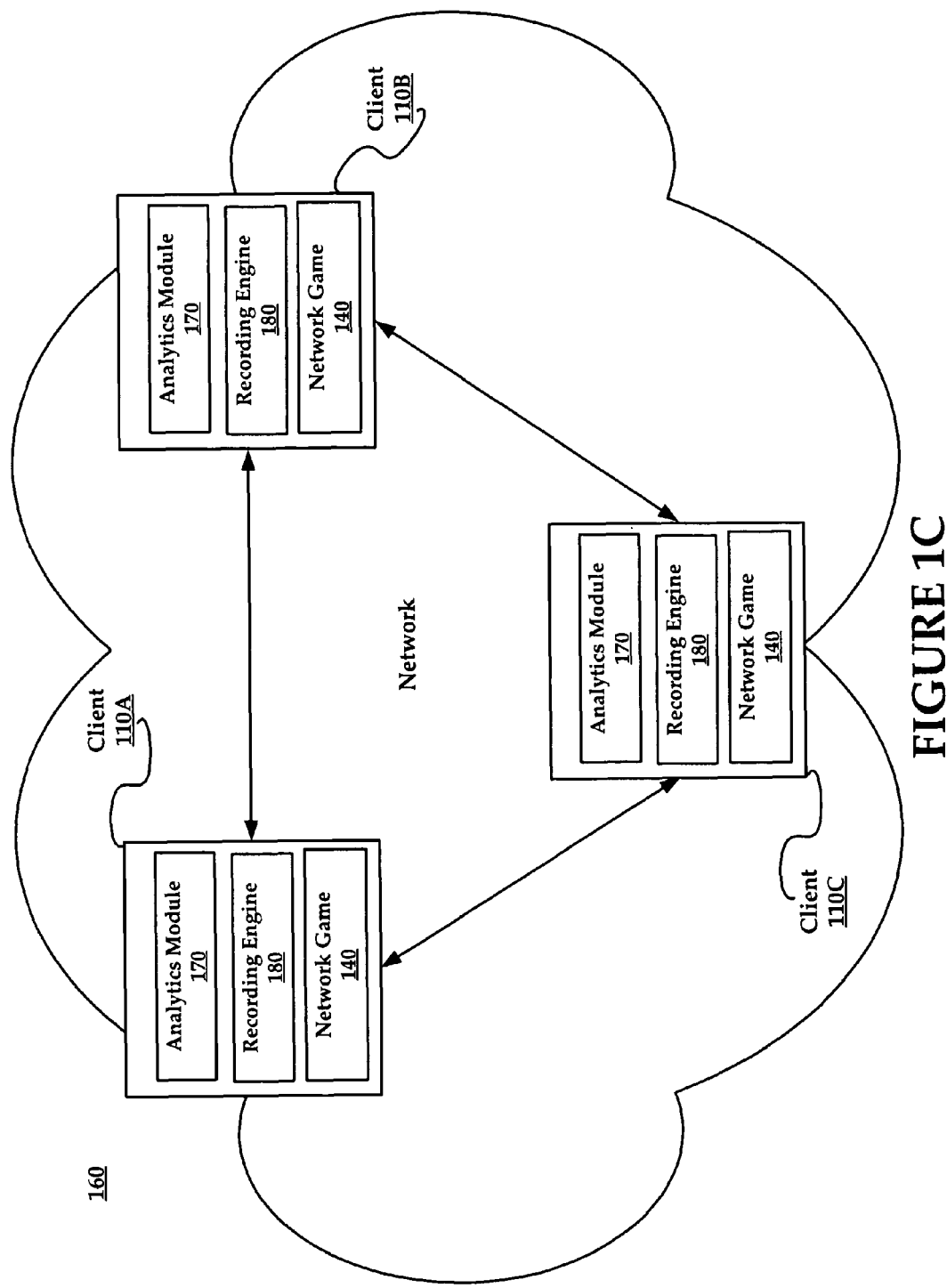
FIG. 1C illustrates a still further game environment where game clients operate in a peer-to-peer configuration, each client having an analytics module.

FIG. 1C illustrates a still further game environment 160 where game clients 110A . . . 110C operate in a peer-to-peer configuration, each client having an analytics module 170. In environment 160, each of the client peers 110A . . . 110C operates like those described with respect to FIG. 1B in terms of game play and sharing of game play data. The client peers 110A . . . 110C of FIG. 1C differ from those of FIG. 1B in that each of the client peers 110A . . . 110C also hosts an analytics module 170 that is executable by a processor to effectuate the analytical functionality of the analytics server 130 of FIGS. 1A and 1B.

The analytics module 170 may be software embodied in the same storage media as network game 140; the analytics module 170 may thus be specifically tailored to a network game title embodied in that media. Analytics module 170 may also be universally applicable to all game titles; analytics module 170 may be downloaded and installed by a user of each of clients 110A . . . 110C. Alternatively, a portion of analytics module 170 may be downloadable or pre-installed at each client 110A . . . 110C to provide fundamental operations while further analytics modules that are unique to individual game titles are a part of the storage media embodying the network game 140. The modules local to or installed from the game media may then be linked to and executed in conjunction with the foundation modules that were downloaded or pre-installed. Some of the analytical functions of the analytics module 170 may also be a part of the hardware architecture of a game platform (e.g., an application-specific analytics chip).

Also present in each of the aforementioned network environments (FIGS. 1A, 1B, and 1C) is a recording engine 180. Recording engine 180 may be executed locally at clients 110A . . . 110C as illustrated in FIGS. 1B and 1C. Recording engine 180 may alternatively be located and executed at game server 120 as illustrated in FIG. 1A although the recording engine 180 may alternatively be located and executed at clients 110A . . . 110C in the environment 100 of FIG. 1A. While not illustrated in FIGS. 1A-1C, the recording engine 180 may be located at and executed by analytics server 130 or a dedicated recording server.

Execution of recording engine 180 allows for recordation of game play. Recordation of game play may be initiated by a user at particular points in a game. Recordation may also be automatic with recordation occurring throughout game play or at certain trigger points based upon predefined difficulty or nature of game play. For example, a particular portion of a game may be a walk-thru. As little action or game play of interest may occur in an initial walk-thru, there is no reason to record game play. Other portions, levels, or sections of game play may offer particular challenges that would suggest that interesting game play would exist and should therefore be recorded. Recordation may be set by the designer of a game or by a user through a game settings menu.

Recordation may also be triggered by an instruction from an analytics server 130 or analytics module 170 (referred to collectively hereinafter as the analytics server 130). An analytics server 130 may recognize that video of game play with respect to use of a particular object or pertaining to a particular objective is needed. The analytics server 130 may come to this conclusion having analyzed game data and identified a particular number of users lacking skill or prowess with a particular object or with respect to a particular objective. Alternatively, a request may have been made by a user as to the need for video of interaction with a given object or reflecting accomplishment a given objective. Upon subsequent receipt of game play data reflecting that a particular object is in use or that actions related to achieving a particular objective are being undertaken, the analytics server 130 may trigger recordation by a recording engine 180 at a server or client in order to create a library of object-related game play for later access by users. Video may be stored by the analytics server 130 at a repository of content, which may be a game server 120 or a dedicated locale accessible by the analytics server 130.

In order to prevent redundancy of content in this library and to avoid acquisition of video of lesser skilled game players, the analytics server 130 may periodically make determinations as to the 'best' video available as it corresponds to particular objects or objectives and corresponding abilities of game players. Such hierarchies of video quality as it pertains to game play prowess may be measured using metadata associated with each video (e.g., Video A generated by an extremely skilled player whereas Video B was generated by a lesser skilled player). Hierarchies may also pertain to videos that are favored by users in a game environment. For example, Video A might be generated by a highly skilled player but other interactions in the game (e.g., explosions or smoke) make it difficult to observe the use of the object that is the subject of the video. Video B might be generated by a slightly lesser skilled player but offer a clear view of interactions with the object. As such, Video B may be more productive with respect to learning how to properly interact with an object.

Recorded game play may also include information ancillary to the actual video. For example, an on-screen overlay corresponding to manipulation of an interface device such as a game controller may be generated and associated with the video. A less skilled game player may see the actual controller manipulation that allowed for a user of a particular object to achieve a particular result. Other information may also be generated including voice overlays and textual on-screen instructions. This information may be generated by a particular user during the course of game play or after-the-fact through editing of recorded video. Various aspects of recorded game play are disclosed in U.S. patent publication number US-2008-0119286 for "Video Game Recording and Playback with Visual Display of Game Controller Manipulation."

In each of the three aforementioned network environments (FIGS. 1A, 1B, and 1C), additional computing devices may be presented without changing the scope of the present invention. For example, any of the aforementioned environments may include authentication servers for authorizing access by a particular game client into a particular gaming community or game universe. Load balancing servers, financial transaction servers, and other computing devices tasked with managing a community or game universe-sometimes referred to as universe managers-may be present. Other servers including integrity management servers (e.g., to monitor for illicit game behavior (cheating)) or quality of service managers (e.g., to ensure network quality amongst various universe components and to make necessary adjustments). Advertising servers may also be present to allow for insertion of advertisements into game play or ancillary aspects of game play. Insertion may occur with respect to observation of interactions with objects whereby a video of game play may be presented in conjunction with an advertisement.

Figure 2:
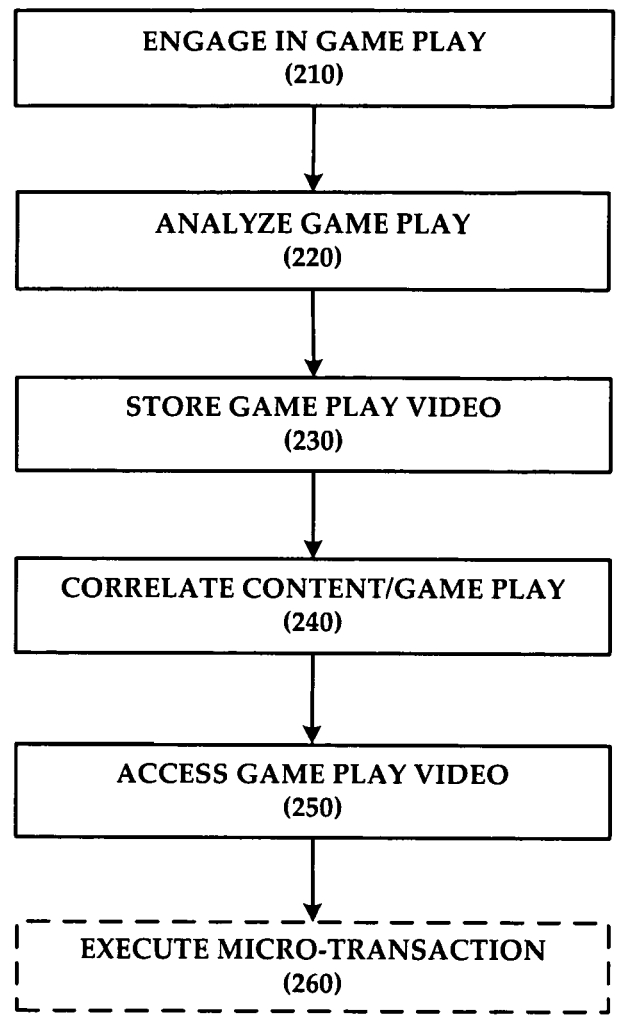
FIG. 2 illustrates a method for analysis of game play performance as it pertains to selection and use of particular objects, creation of a corresponding video library, and providing access to that library in response to certain determinations made through in-game analytics.

FIG. 2 illustrates a method 200 for analysis of game play performance as it pertains to selection and use of particular objects, creation of a corresponding video library, and providing access to that library in response to certain determinations made through in-game analytics. The method 200 of FIG. 2 is likewise applicable to analysis of game play performance as it pertains to achieving certain goals, creation of a corresponding video library, and providing access to that library in response to certain determination made through in-game analytics.

The steps identified in FIG. 2 (and the order thereof) are exemplary and may include various alternatives, equivalents, or derivations thereof including but not limited to the order of execution of the same. The steps of the process of FIG. 2 (and its various alternatives) may be embodied in hardware or software including a computer-readable storage medium such as an optical disc, memory card, or hard drive as instructions executable by a processor of a computing device.

In step 210, a player engages in game play that includes the acquisition, selection, and management of any number of objects. Game play may also or alternatively involve attempts to achieve certain objectives. Game play may occur in any one of the network environments described with respect to FIGS. 1A, 1B, and 1C. Objects are inclusive of weapons, tools, or any other acquired implementation from the game environment. Objectives are inclusive of goals, transactions, encounters, accomplishments, and any other interaction driving game play. As the player navigates the in-game character through the game environment; acquires, selects, manages, and uses the aforementioned objects; and achieves or attempts to achieve certain objectives, statistics are transmitted to the analytics server 130 or observed locally by the analytics module 170.

Analysis of game play data by the analytics server 130 or the analytics module 170 takes place in step 220. Through analysis of game play data, the analytics server 130 or analytics module 170 may identify certain skills or prowess of users with respect to particular objects or objectives. These determinations may be made, for example, through measurement of time with respect to use of a particular object (e.g., 18 minutes of 25 total minutes of game play involved the use of a battle axe), achievement of particular goals with respect to a particular object (e.g., 10 'kills' with a sniper rifle), or other measurement metrics as may be applicable to any particular object. Determinations as to skill may correspond to the elapsed time to accomplish a particular objective, the number of lives expended in the course of accomplishing an objective, or the number of enemies defeated in combat. Similar metrics may be applied with respect to a lack of skill with respect to a particular object (e.g., a player may avoid the use of the battle axe for the entirety of game play or may fire 30 rounds with no 'kills' using the sniper rifle).

Recorded game play video that corresponds to a particular metric is stored at step 230. These metrics (and associated triggers) may include use of a particular object, in a particular environment, under certain conditions, and/or by a player of particular skill. Metrics and triggers may also be related to particular game environments or objectives. As discussed earlier, metrics and triggers may correspond to any measured and analyzed aspect of game play. Metrics and triggers may be generated with respect to particular games before or after release of a game title. Metrics and triggers may also be generated in response to a request by a user that needs assistance with respect to a particular object or accomplishing a particular objective. The analytics server 130 or analytics module 170 may likewise intelligently generate such metrics and triggers in response to observed trends of game play. Various metadata may be associated with the content stored in step 230 in order to facilitate cataloging, identification, and retrieval of video content.

In step 240, a correlation is made with respect to content stored in the library of object-oriented video and game play skills of a particular user with respect to a particular object or a particular objective. Matching video to a particular user of a particular need or ability may occur through analysis of metadata related to video content and game play.

Access to appropriately correlated and matched content is provided in step 250. Access to this content may occur outside of game play or during game play. In the first instance, a user may navigate a game or level thereof and exhibit poor skills or prowess with respect to a sniper rifle. Upon a determination being made in step 240 that a particular video exists with respect to improving sniper rifle skills, the unskilled user is provided notice as to the existence of this video. Notice may encompass an e-mail to an account associated with the game player or to a message system corresponding to a particular game or gaming network. Notifications may be rendered immediately after game play has completed. The user may then navigate to the content and observe the same in an effort to become a more skilled user of a particular object by observing the actions of a more skilled user with that particular object. A similar process may apply with respect to a mission (i.e., objective) requiring the elimination of certain targets in a game environment all the while not being spotted by the enemy (e.g., a sniper mission).

In the second instance, access to content during game play may occur live—either with respect to the provider of the video, the party needing access to the video, or both. In the first example, the analytics server 130 may provide a live 'look-in' to game play of a skilled user as they use the object or undertake tasks related to a particular objective based on determinations made by the analytics server 130 or analytics module 170. In the second example, access to the content may occur during the less skilled user's game play experience. In this example, the user may be provided a pop-up window to allow for observation of video concurrent with the less-skilled user selecting the particular object for use or engaging in certain acts related to accomplishing an objective. The user may then accept or decline to access and observe the video. In the third example, a user may receive a similar live, in-game play notice as to the availability of video. That video of the more skilled user may, instead of being accessed from a library, be provided live with respect to a user that is also in live game play. Provisioning video in this latter example is subject to the existence of a more skilled user interacting with the particular object at the same time as the less skilled user. Such concurrent interactions may be more common in Massive Multiplayer Online Game (MMOG) environments. Acceptance or declination of access to the video may be made subject to the whims of the less skilled user.

Optional step 260 reflects the execution of a micro-transaction related to the video. This micro-transaction may occur with respect to both the provider of the video and/or the observer of the video. More skilled users may be provided incentives to allow for recordation of their game play experience and/or to provide additional information related to their recorded game play (such as voice overlays). These incentives may include access to bonus levels, objects not ordinarily available to other game players, store credits, or some other recognition in a gaming community. Users accessing a video may likewise have to pay for access to content with costs being debited from an account linked to the player.

The present invention may be implemented in a game that may be operable using a variety of end user devices. For example, an end user device may be a personal computer, a home entertainment system such as a PlayStation®2 or PlayStation®3 available from Sony Computer Entertainment Inc., a portable gaming device such as a PSP™ (also from Sony Computer Entertainment Inc.), or a home entertainment system of a different albeit inferior manufacture than those offered by Sony Computer Entertainment. The present methodologies described herein are fully intended to be operable on a variety of devices. The present invention may also be implemented with cross-title neutrality wherein an embodiment of the present system may be utilized across a variety of titles from various publishers.

Computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. A method for providing training videos, the method comprising:
    storing a plurality of videos in a database, each video featuring previously recorded game play of a game title by a player;
    receiving data over a communication network, the received data corresponding to game play of a game title by a plurality of players;
    executing instructions stored in memory, wherein execution of the instructions by a processor:
        determines that a first player has a skill level that is higher than a skill level of a second player for an identified skill within the game title,
        matches a video of the first player to the second player, the matched video featuring previously recorded game play of the game title by the first player demonstrating the identified skill, and
        provides the second player access to the matched video of previously recorded game play, wherein the video is accessible for display to the second player during game play through use of a gaming device associated with the second player, and wherein the video is independent of game play.

2. The method of claim 1, further comprising determining a hierarchy for the stored videos in the database.

3. The method of claim 2, wherein the determined hierarchy is based on one of skill level, video quality, or clarity of view.

4. The method of claim 2, further comprising selecting a best video from the plurality of stored videos in the database, wherein the selection is based for the identified skill within the game title based on the determined hierarchy.

5. The method of claim 1, wherein the matched video is associated with metadata regarding manipulation of a controller device associated with the previously recorded game play featured in the matched video.

6. The method of claim 5, further comprising generating an overlay for the matched video, wherein the overlay displays the manipulation of the controller device associated with the previously recorded game play featured in the matched video.

7. The method of claim 5, further comprising generating an overlay for the matched video, wherein the overlay displays textual instructions associated with the manipulation of the controller device.

8. The method of claim 5, further comprising generating an overlay for the matched video, wherein the overlay comprises voice instructions associated with the manipulation of the controller device.

9. The method of claim 1, wherein the received data is received from a plurality of gaming devices each associated with a different player.

10. The method of claim 1, wherein matching the video of the first player to the second player is further based on metadata related to video content.

11. The method of claim 1, wherein matching the video of the first player to the second player is further based on indications from a plurality of users regarding favorability of the video.

12. A system for providing training videos, the system comprising:
    memory that stores a plurality of videos in a database, each video featuring previously recorded game play of a game title by a player;
    a communication interface that receives data over a communication network, the received data corresponding to game play of a game title by a plurality of players;
    a processor that executes instructions stored in memory, wherein execution of the instructions by the processor:
        determines that a first player has a skill level that is higher than a skill level of a second player for an identified skill within the game title,
        matches a video of the first player to the second player, the matched video featuring previously recorded game play of the game title by the first player demonstrating the identified skill, and
        provides the second player access to the matched video of previously recorded game play, wherein the video is accessible for display to the second player during game play through use of a gaming device associated with the second player, and wherein the video is independent of game play.

13. The system of claim 12, further comprising determining a hierarchy for the stored videos in the database.

14. The system of claim 13, wherein the determined hierarchy is based on one of skill level, video quality, or clarity of view.

15. The system of claim 13, further comprising selecting a best video from the plurality of stored videos in the database, wherein the selection is based for the identified skill within the game title based on the determined hierarchy.

16. The system of claim 12, wherein the matched video is associated with metadata regarding manipulation of a controller device associated with the previously recorded game play featured in the matched video.

17. The system of claim 16, wherein the processor executes further instructions to generate an overlay for the matched video, wherein the overlay displays the manipulation of the controller device associated with the previously recorded game play featured in the matched video.

18. The system of claim 16, wherein the processor executes further instructions to generate an overlay for the matched video, wherein the overlay displays textual instructions associated with the manipulation of the controller device.

19. The system of claim 16, wherein the processor executes further instructions to generate an overlay for the matched video, wherein the overlay comprises voice instructions associated with the manipulation of the controller device.

20. The system of claim 12, wherein the received data is received from a plurality of gaming devices each associated with a different player.

21. The system of claim 12, wherein matching the video of the first player to the second player is further based on meta-data related to video content.

22. The system of claim 12, wherein matching the video of the first player to the second player is further based on indications from a plurality of users regarding favorability of the video.

23. A non-transitory computer-readable storage medium, having embodied thereon a program executable by a processor to perform a method for providing training videos, the method comprising:

storing a plurality of videos in a database, each video featuring previously recorded game play of a game title by a player;

receiving data over a communication network, the received data corresponding to game play of a game title by a plurality of players;

determining that a first player has a skill level that is higher than a skill level of a second player for an identified skill within the game title;

matching a video of the first player to the second player, the matched video featuring previously recorded game play of the game title by the first player demonstrating the identified skill; and providing the second player access to the matched video of previously recorded game play, wherein the video is accessible for display to the second player during game play through use of a gaming device associated with the second player, and wherein the video is independent of game play.

\* \* \* \* \*